US012616339B2

(12) United States Patent
West

(10) Patent No.: US 12,616,339 B2
(45) Date of Patent: May 5, 2026

(54) HERB GRINDER WITH A CLEANING ATTACHMENT

(71) Applicant: VPR Brands, LP, Sunrise, FL (US)

(72) Inventor: David E. West, St. Augustine, FL (US)

(73) Assignee: VPR Brands, LP, Sunrise, FL (US)

( * ) Notice: Subject to any disclaimer, the term of this patent is extended or adjusted under 35 U.S.C. 154(b) by 372 days.

(21) Appl. No.: 18/513,444

(22) Filed: Nov. 17, 2023

(65) Prior Publication Data

US 2025/0160572 A1     May 22, 2025

(51) Int. Cl.
| | |
|---|---|
| *A47J 42/38* | (2006.01) |
| *A47J 42/24* | (2006.01) |
| *A47J 42/30* | (2006.01) |
| *A47J 42/34* | (2006.01) |
| *A47J 42/40* | (2006.01) |
| *B08B 9/08* | (2006.01) |

(52) U.S. Cl.
CPC .............. *A47J 42/38* (2013.01); *A47J 42/24* (2013.01); *A47J 42/30* (2013.01); *B08B 9/0808* (2013.01)

(58) Field of Classification Search
CPC .. A47J 42/38; A47J 42/24; A47J 42/30; A47J 42/34; A47J 42/40; B08B 9/0808
See application file for complete search history.

(56) References Cited

U.S. PATENT DOCUMENTS

| | | |
|---|---|---|
| 4,483,611 A | 11/1984 | Matsuura et al. |
| 4,542,620 A | 9/1985 | Kase et al. |
| 4,674,865 A | 6/1987 | Tada et al. |
| 5,353,461 A | 10/1994 | Enriquez |
| 6,352,471 B1 | 3/2002 | Bange et al. |
| 6,851,635 B2 | 2/2005 | McCowin |
| 8,216,385 B2 | 7/2012 | Dick et al. |
| 9,192,194 B2 | 11/2015 | Fakhouri et al. |
| 9,521,929 B1 | 12/2016 | Raphael |
| 9,635,884 B2 | 5/2017 | Shalom |
| 9,730,554 B2 | 8/2017 | Chan |
| 9,770,093 B2 | 9/2017 | Morgan |
| 10,028,618 B1 | 7/2018 | Benson |
| 10,343,175 B1 | 7/2019 | Abehasera |
| 10,478,825 B2 | 11/2019 | Mroue |
| 10,617,259 B2 | 4/2020 | Staiano et al. |
| 11,179,008 B2 | 11/2021 | Wiener et al. |
| 11,191,296 B2 | 12/2021 | Abehasera |

(Continued)

*Primary Examiner* — Mohammed S. Alawadi

(74) *Attorney, Agent, or Firm* — Hanley, Flight & Zimmerman, LLC

(57)     ABSTRACT

An herb grinder with a cleaning attachment comprises a bristle assembly and a grinding assembly which is further comprised of a top grinding component, a bottom grinding component and a collecting compartment. The top grinding component and the bottom grinding component are detachably connected and are configured to be rotated relatively to each other. The bristle assembly and the grinding assembly form an internal space configured to receive the bristle plate, and are both interlocking and magnetically connected to prevent relative rotation between the bristle assembly and the grinding assembly when grinding. The bristle assembly may be detachable to clean the top grinding component and the bottom grinding component. The herb grinder further comprises a housing which is interchangeable with the grinding assembly for convenient portability and storage.

20 Claims, 13 Drawing Sheets

(56)          References Cited

U.S. PATENT DOCUMENTS

| | | |
|---|---|---|
| 11,203,021 B2 | 12/2021 | Huang |
| 11,207,695 B2 | 12/2021 | Breneman |
| 11,278,154 B2 | 3/2022 | Abehasera |
| 11,589,710 B2 | 2/2023 | Staiano et al. |
| 2016/0100715 A1* | 4/2016 | Staiano ................... A47J 42/34 |
| | | 241/79 |
| 2017/0197217 A1 | 7/2017 | Bruggemann |
| 2018/0126386 A1* | 5/2018 | Witko ..................... B02C 18/16 |
| 2021/0007555 A1* | 1/2021 | Smith ..................... A47J 42/30 |
| 2021/0038027 A1 | 2/2021 | McCreedy |
| 2021/0153691 A1 | 5/2021 | Lemasters et al. |
| 2021/0212518 A1 | 7/2021 | Christodoulou et al. |
| 2022/0095670 A1 | 3/2022 | Fausto-Contreras |
| 2022/0265090 A1 | 8/2022 | Hall |
| 2022/0313020 A1* | 10/2022 | Shick ..................... A47J 42/42 |
| 2022/0347775 A1 | 11/2022 | Grigoryants |

* cited by examiner

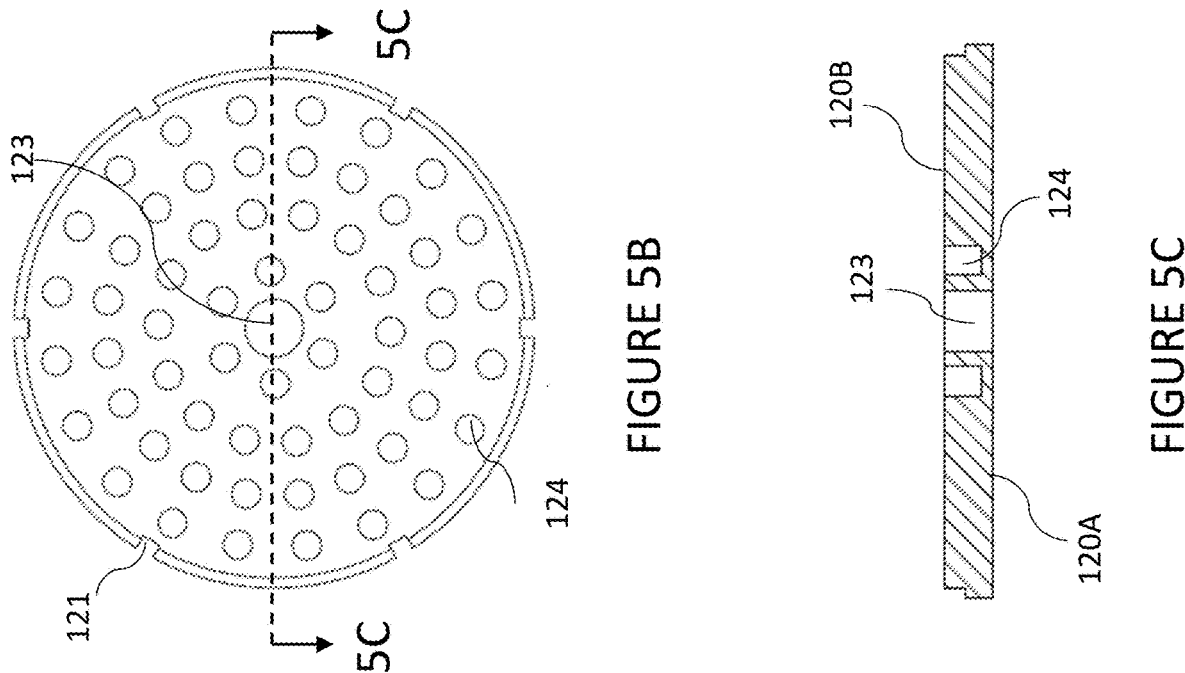
FIGURE 5B
FIGURE 5C
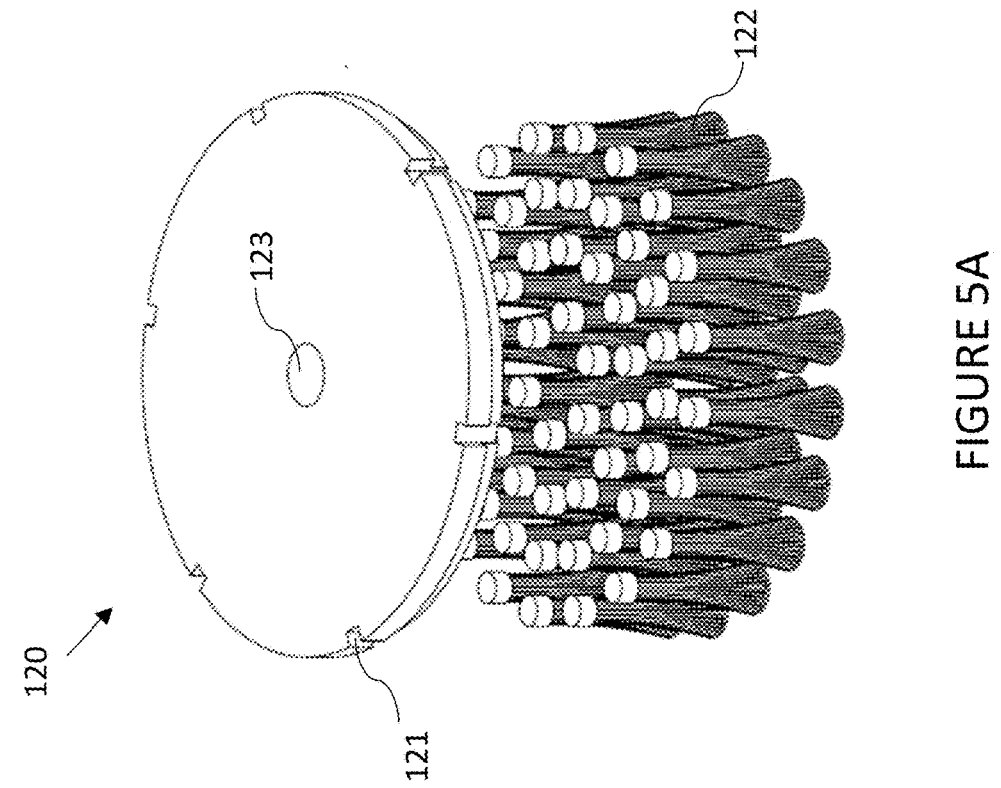
FIGURE 5A

6C

6C

122A

122B

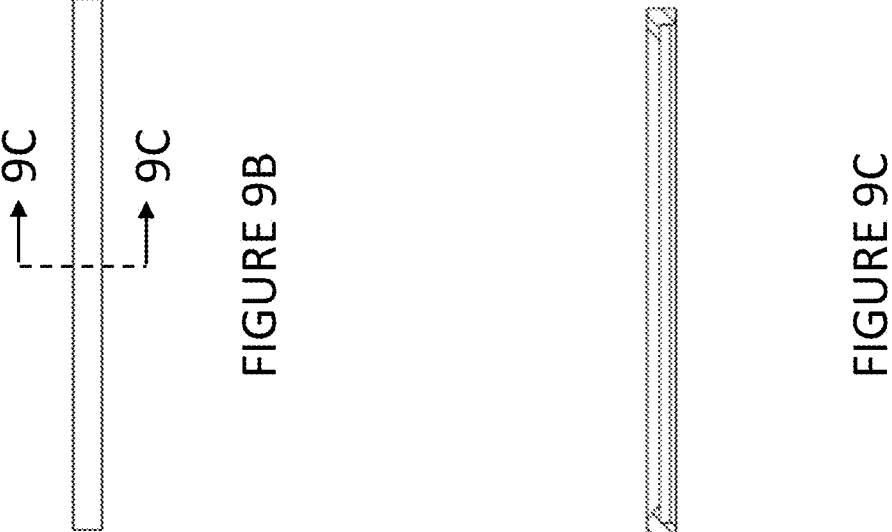
FIGURE 9B
FIGURE 9C
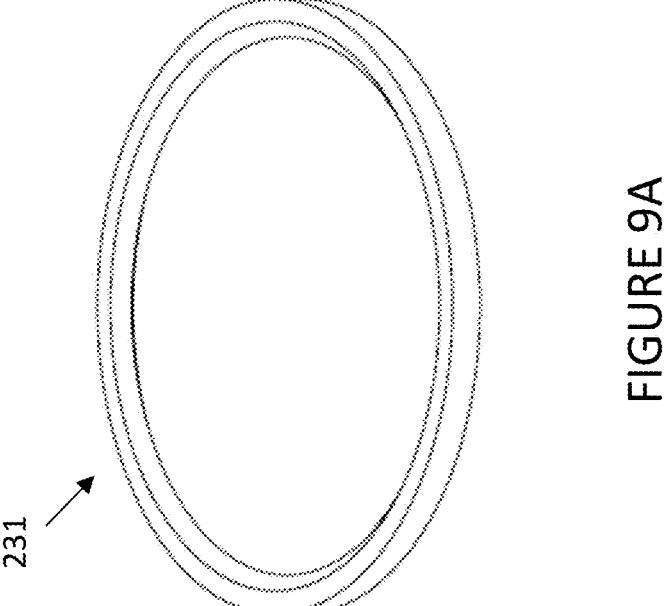
FIGURE 9A

HERB GRINDER WITH A CLEANING ATTACHMENT

FIELD OF THE INVENTION

The subject matter disclosed herein generally relates to an herb grinder and more specifically to an herb grinder that comprises a cleaning attachment.

BACKGROUND

Herb grinders may be used for multiple purposes, whether for smoking or culinary applications, to finely grind or chop herbs and spices into smaller, desirable pieces.

Typically, an herb grinder comprises two grinding plates with interlocking blades. However, particularly for vaporizing or smoking herbs, resinous substances such as kief may adhere to the teeth, blades, or other surfaces of the grinding plates. As kief accumulates, the accumulation may clog up the herb grinder and prevent the herb grinder from functioning properly or efficiently. Therefore, adequate, and routine cleaning of the herb grinder is essential.

Currently, cleaning of the herb grinder is often done by applying chemicals or utilizing sharp implements and scrub brushes. However, it is desirable to reduce exposure to chemicals and the sharp implements and scrub brushes may not be suitable for the herb grinder. Consequently, there is a need for an herb grinder with a cleaning attachment that is convenient, suitable for daily use, and compatible with the teeth and blades.

SUMMARY OF THE INVENTION

The following is a concise summary of the invention presented herein with the primary aim of providing a preliminary understanding of certain aspects of the invention. It should be noted, however, that this summary is not intended to serve as a comprehensive overview of the invention, nor does it seek to identify or describe any critical or significant elements of the invention or the boundaries of its scope. Its sole purpose is to provide a rudimentary understanding of the invention's concepts and features, which will be expounded upon in greater detail in the ensuing sections.

The present disclosure is generally directed towards an herb grinder with a cleaning attachment, herein referred to as the "herb grinder". An exemplary, nonlimiting embodiment of the present disclosure provides an herb grinder comprising a bristle assembly and a grinding assembly interlocking and magnetically coupled to the bristle assembly. The grinding assembly may be interchangeable with a housing for convenient portability. The bristle assembly further comprises a lid and a bristle plate, and the grinding assembly is further comprised of a top grinding component, a bottom grinding component rotatably coupled to the top grinding component, and a collecting compartment coupled to the bottom grinding component. The bristle assembly, the top grinding component, the bottom grinding component, and the collecting compartment may be assembled and disassembled effortlessly.

The lid has an interior surface and an exterior surface and further comprises at least one first interlocking connector on the interior surface. Preferably, the at least one first interlocking connector are dimensioned along a perimeter of the interior surface and extend radially inwards from the perimeter. The lid may also include a magnet or a ferromagnetic material.

The bristle plate comprises a first end and a second end. The first end is coupled to the interior surface of the lid, and the second end comprises a plurality of bristles extending away thereof. Preferably, the bristle plate may further comprise at least one opening along its perimeter to accommodate the at least one interlocking connector.

It is anticipated that the number of magnets or the ferromagnetic materials can vary, and can be located on the lid or the bristle plate, provided that the bristle assembly is magnetically connected to the grinding assembly. It is also anticipated the at least one first interlocking connector may be arranged anywhere on the interior surface of the lid, and the bristle plate may comprise corresponding openings to accommodate the at least one first interlocking connector.

The top grinding component has an upper end and a lower end. The upper end is both magnetically and interlocking connected to the bristle assembly. The upper end further comprises at least one second interlocking connector corresponding to the first interlocking connector configured to form an interlocking connection with the lid. Preferably, the at least one first interlocking connector extends through the at least one opening of the bristle plate and engages with the at least one second interlocking connector. The upper end and the interior surface of the lid form an internal space configured to receive the bristle plate. In addition, the top grinding component further comprises a plurality of top grinding blades extending away from the lower end.

The bottom grinding component has a top end and a bottom end. The top end of the bottom grinding component is rotatably connected to the lower end of the top grinding component, forming a grinding compartment. The bottom grinding component further comprises a plurality of bottom grinding blades extending away from the top end, configured to engage with the top grinding blades.

The collecting compartment is coupled to the bottom end of the bottom grinding component, forming an enclosed chamber. The collecting compartment comprises a sieve subdividing the enclosed chamber to an upper chamber and a lower chamber. In addition, the collecting compartment may further comprise a sieve holder, a chamber component, and a base. The sieve holder, the chamber component, and the base are separable. The sieve holder is placed within the chamber component to secure the sieve, and the base is used to collect ground particles that passed through the sieve. Preferably, the sieve comprises non-corrosive mesh materials, such as, but not limited to, metal or plastic mesh.

The housing has a free end and a closed end. The free end is both magnetically and interlocking connected to the bristle assembly. The free end further comprises at least one third interlocking connector corresponding to the first interlocking connector configured to form an interlocking connection with the lid. Preferably, the at least one first interlocking connector extends through the at least one opening of the bristle plate and engages with the at least one third interlocking connector. The upper end and the interior surface of the lid form an accommodation configured to receive the bristle plate.

BRIEF DESCRIPTION OF THE DRAWINGS

FIG. 5A depicts an exploded perspective view of an exemplary bristle plate of the exemplary embodiment of the herb grinder.

FIG. 5B depicts a bottom plan view of the exemplary bristle plate of the exemplary embodiment of the herb grinder.

FIG. 5C depicts a cross-section taken along line 5C-5C in FIG. 5B.

FIG. 9A depicts a perspective view of an exemplary sieve holder of the exemplary embodiment of the herb grinder.

FIG. 9B depicts a front plan view of the exemplary sieve holder of the exemplary embodiment of the herb grinder.

FIG. 9C depicts a cross-section taken along line 9C-9C in FIG. 9B.

NUMBER REFERENCES

1—Exemplary Embodiment of the Herb Grinder
100—Bristle Assembly
110—Lid
110A—Exterior Surface
110B—Interior Surface
111—First Interlocking Connector/Protrusions
112—First Receptacle
120—Bristle Plate
120A—First End
120B—Second End
121—Openings
122—Bristles
122A—Bristle Tufts
122B—Bristle Cap
123—Through Hole
124—Recess
125—Magnet/Ferromagnetic Material
126—First O-ring
210—Top Grinding Component
210A—Upper End
210B—Lower End
212—Annular Flange
213—Second Interlocking Connector/Notch
214—Second Receptacle
215—Magnet/Ferromagnetic Material
216—Top Grinding Blades
217—Third Receptacle
218—Magnet/Ferromagnetic Material
219—First Peripheral Wall
220—Bottom Grinding Component
220A—Top End
220B—Bottom End
221—Bottom Grinding Blades
222—Inner Rim
223—Bore
224—Fourth Receptacle
225—Magnet/Ferromagnetic Material
226—Second O-ring
227—Second Peripheral Wall
230—Collecting Compartment
231—Sieve Holder
232—Sieve
233—Chamber Component
233A—Proximal End
233B—Distal End
2331—Lip
2332—Slot
234—Base
300—Housing
300A—Free End
300B—Closed End
301—Opening/Slit
302—Annular Flange
303—Fifth Receptacle
304—Third Peripheral Wall 305—Magnet/Ferromagnetic Material
306—Third O-ring

DETAILED DESCRIPTION

The following detailed description and accompanying drawings provide a comprehensive disclosure of exemplary embodiments for the purpose of facilitating one of ordinary skill in the relevant art to make and use the invention. Therefore, the detailed description and illustration of the one or more exemplary embodiments presented herein are purely exemplary in nature and are not intended to limit the scope of the invention or its protection in any manner. It is further noted that the drawings may not be to scale, and in some cases, certain details may be omitted which are not necessary for an understanding of the present invention, such as conventional details of fabrication and assembly.

Figure 1:
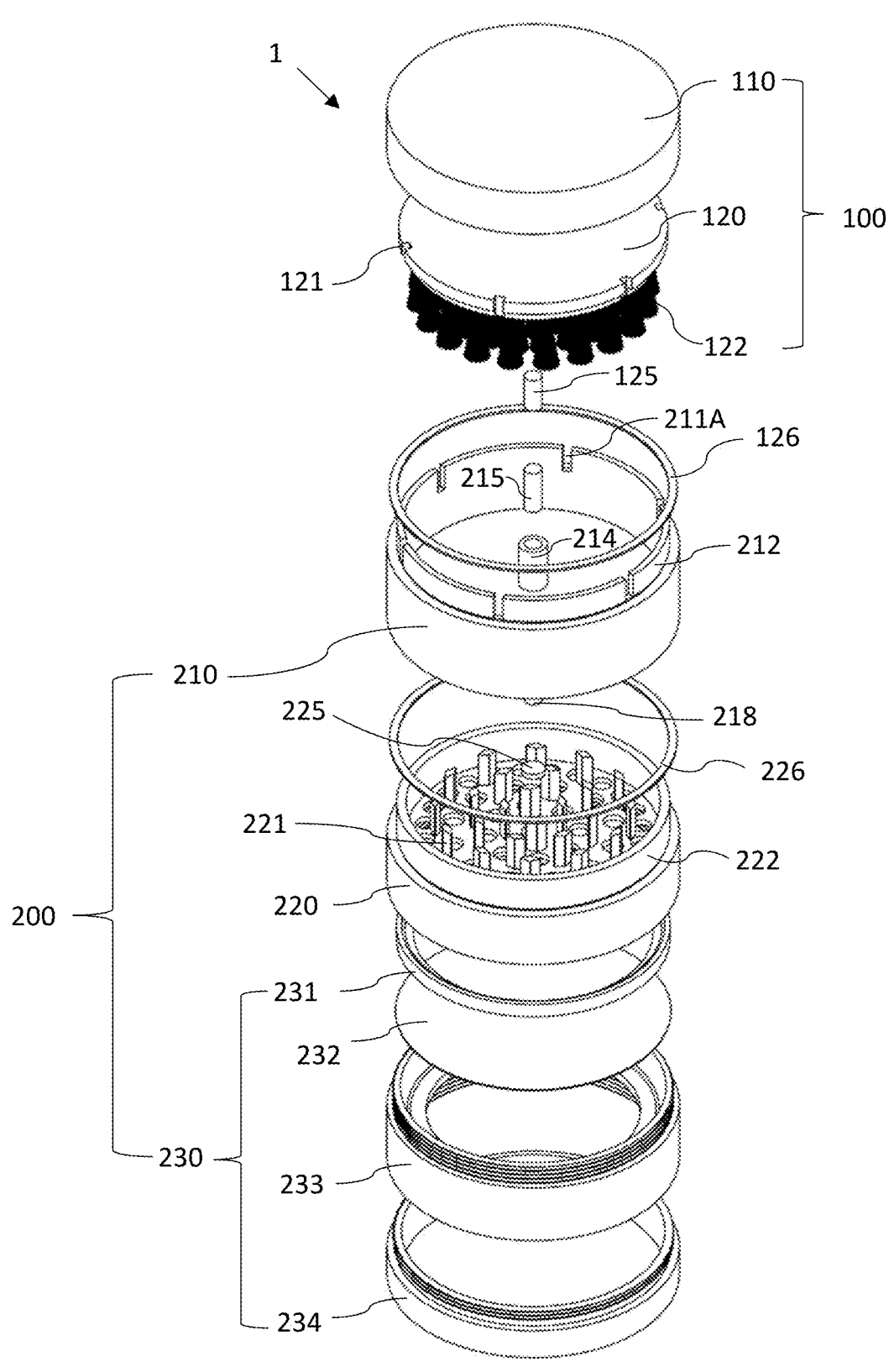
FIG. 1 depicts an exploded perspective view illustrating an exemplary bristle assembly and an exemplary grinding assembly of an exemplary embodiment of an herb grinder.
Figure 2:
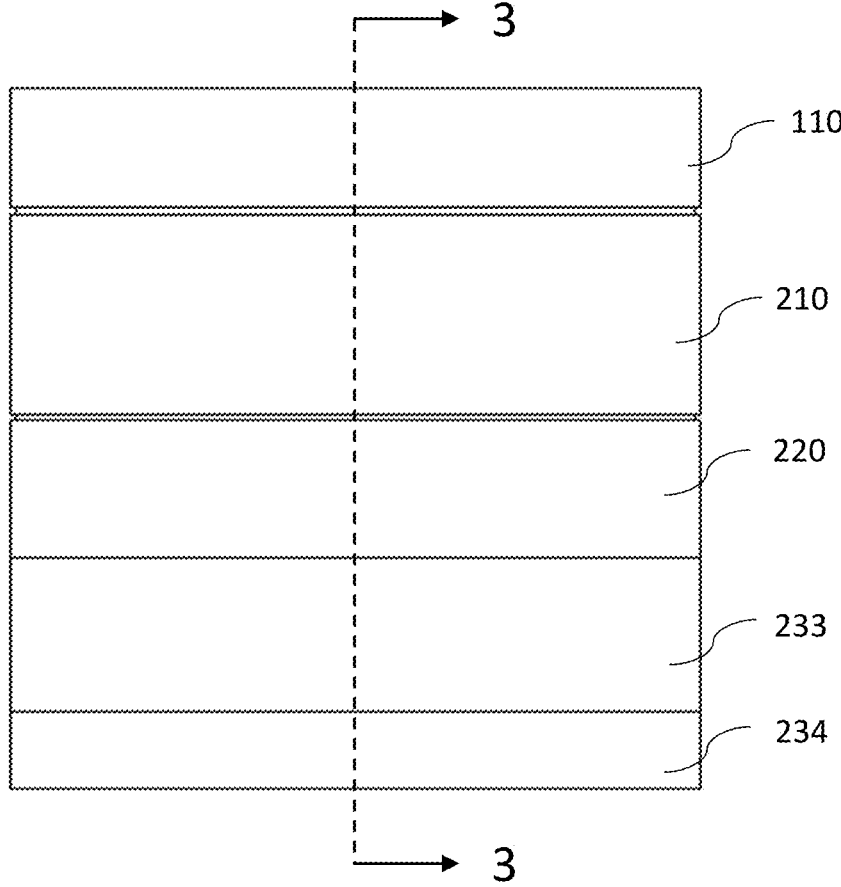
FIG. 2 depicts a front plan view of the exemplary embodiment of the herb grinder.
Figure 3:
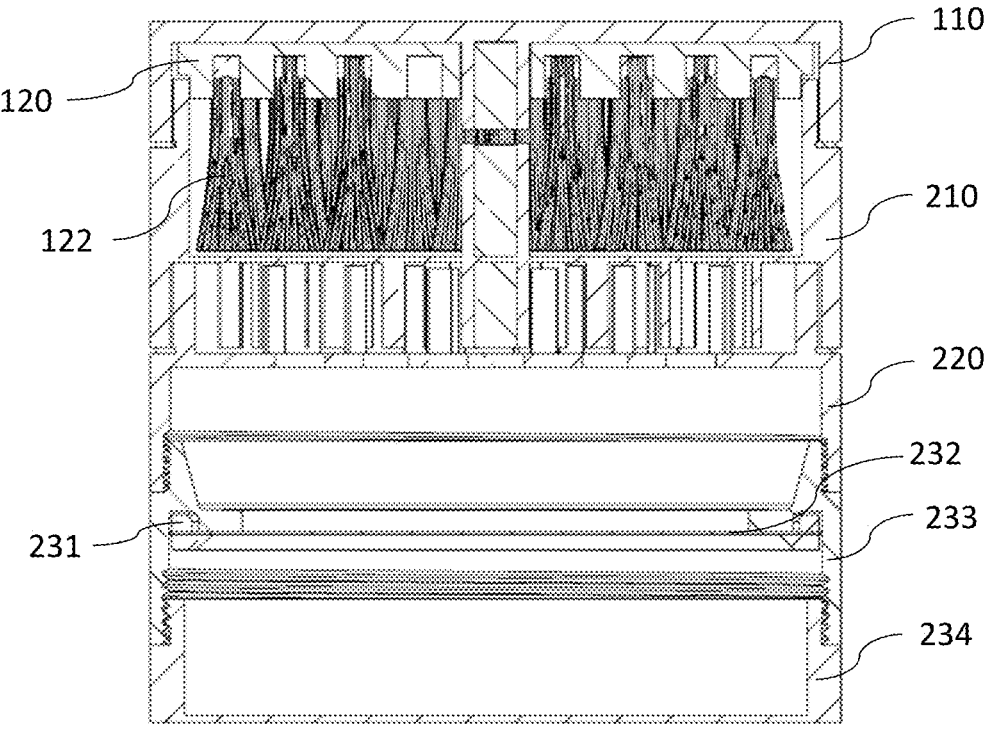
FIG. 3 depicts a cross-sectional view taken along line 3-3 in FIG. 2.
Figures 4A, 4B, 4C, 4D:
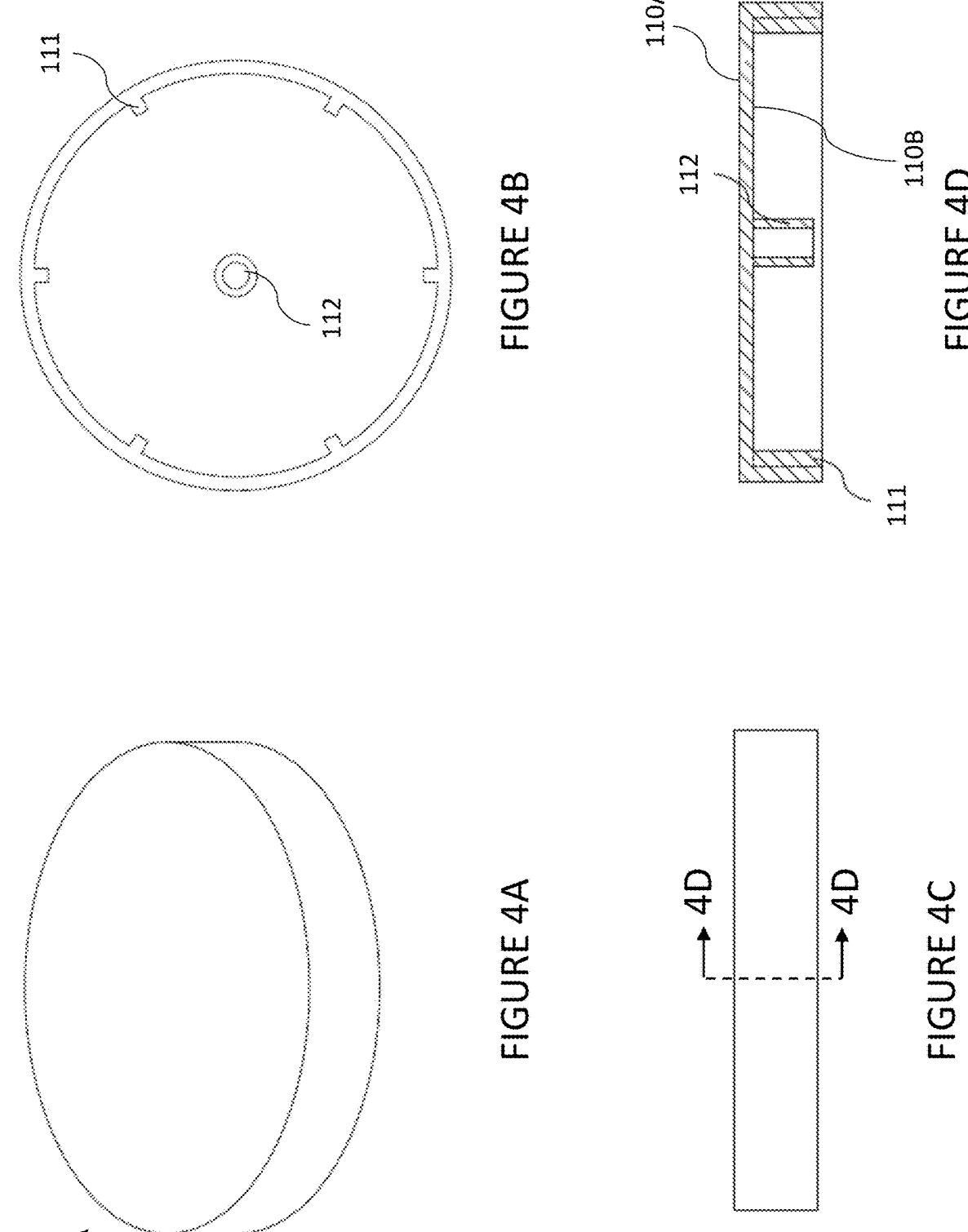
FIG. 4A depicts a perspective view of an exemplary lid of the exemplary embodiment of the herb grinder.
FIG. 4B depicts a bottom plan view of the exemplary lid of the exemplary embodiment of the herb grinder.
FIG. 4C depicts a front plan view of the exemplary lid of the exemplary embodiment of the herb grinder.
FIG. 4D depicts a cross-section taken along line 4D-4D in FIG. 4D.

An exemplary, nonlimiting embodiment of the present disclosure provides an herb grinder with a cleaning attachment, herein referred to as the "herb grinder" 1, is shown in FIGS. 1 to 3, which can be assembled and disassembled effortlessly. The exemplary embodiment of the herb grinder 1 has a substantially cylindrical profile and generally comprises a bristle assembly 100 and a grinding assembly 200. When rotating the grinding assembly 200 for grinding purposes, the bristle assembly 100 is interlocked with the grinding assembly 200 to avoid relative rotation. After use of the grinding assembly 200, the bristle assembly 100 can be easily detached to clean the grinding assembly 200. The grinding assembly 200 may also be interchangeable with a housing 300 for convenient portability. The bristle assembly 100 further comprises a lid 110 and a bristle plate 120. The grinding assembly 200 further comprises a top grinding component 210, a bottom grinding component 220 and a collecting compartment 230.

As illustrated in FIGS. 4A to 4D, the lid 110 has an exterior surface 110A and an interior surface 110B, and comprises at least one first interlocking connector 111 on the interior surface 110. In the exemplary embodiment, the at least one first interlocking connector 111 are a plurality of protrusions 111 dimensioned along a perimeter of the interior surface 110B and extend radially inwards from the perimeter. The lid 110 also includes a first receptacle 112, configured to receive a magnet or a ferromagnetic material 125.

Figure 6C:
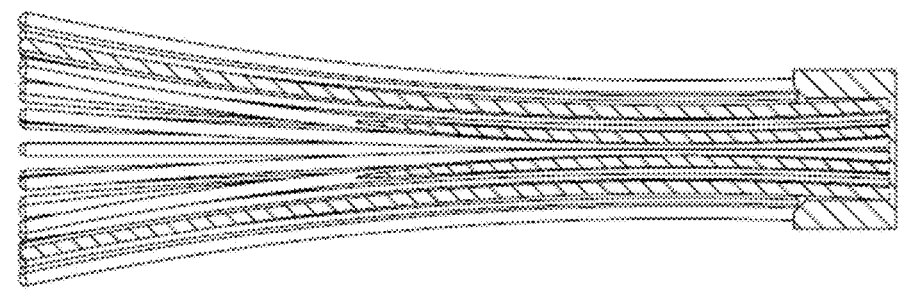
FIG. 6C depicts a cross-sectional view taken along line 6C-6C in FIG. 6B.
Figure 6B:
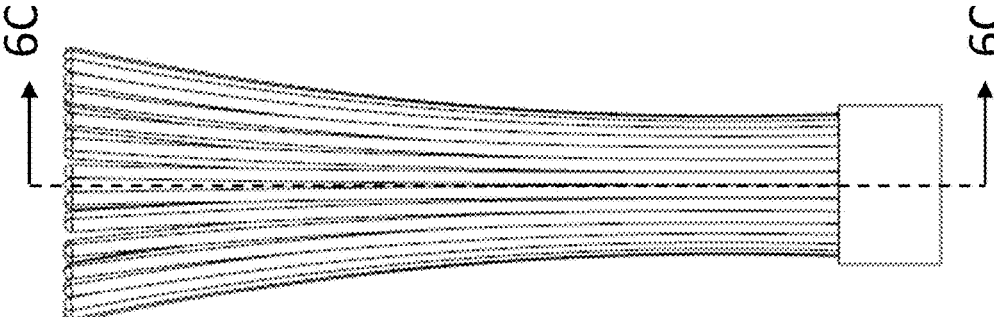
FIG. 6B depicts a front plan view of the exemplary bristle tuft of the exemplary embodiment of the herb grinder.
Figure 6A:
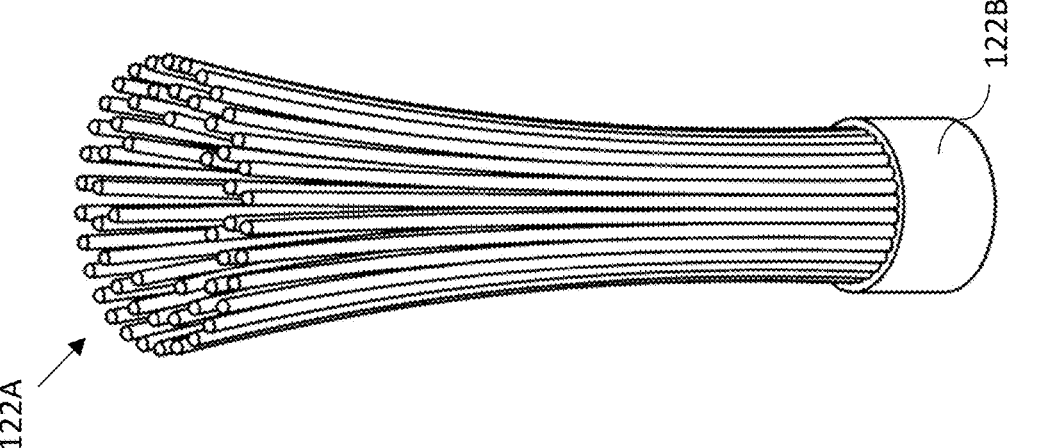
FIG. 6A depicts a perspective view of an exemplary bristle tuft of the exemplary embodiment of the herb grinder.
Figures 7A, 7B, 7C, 7D:
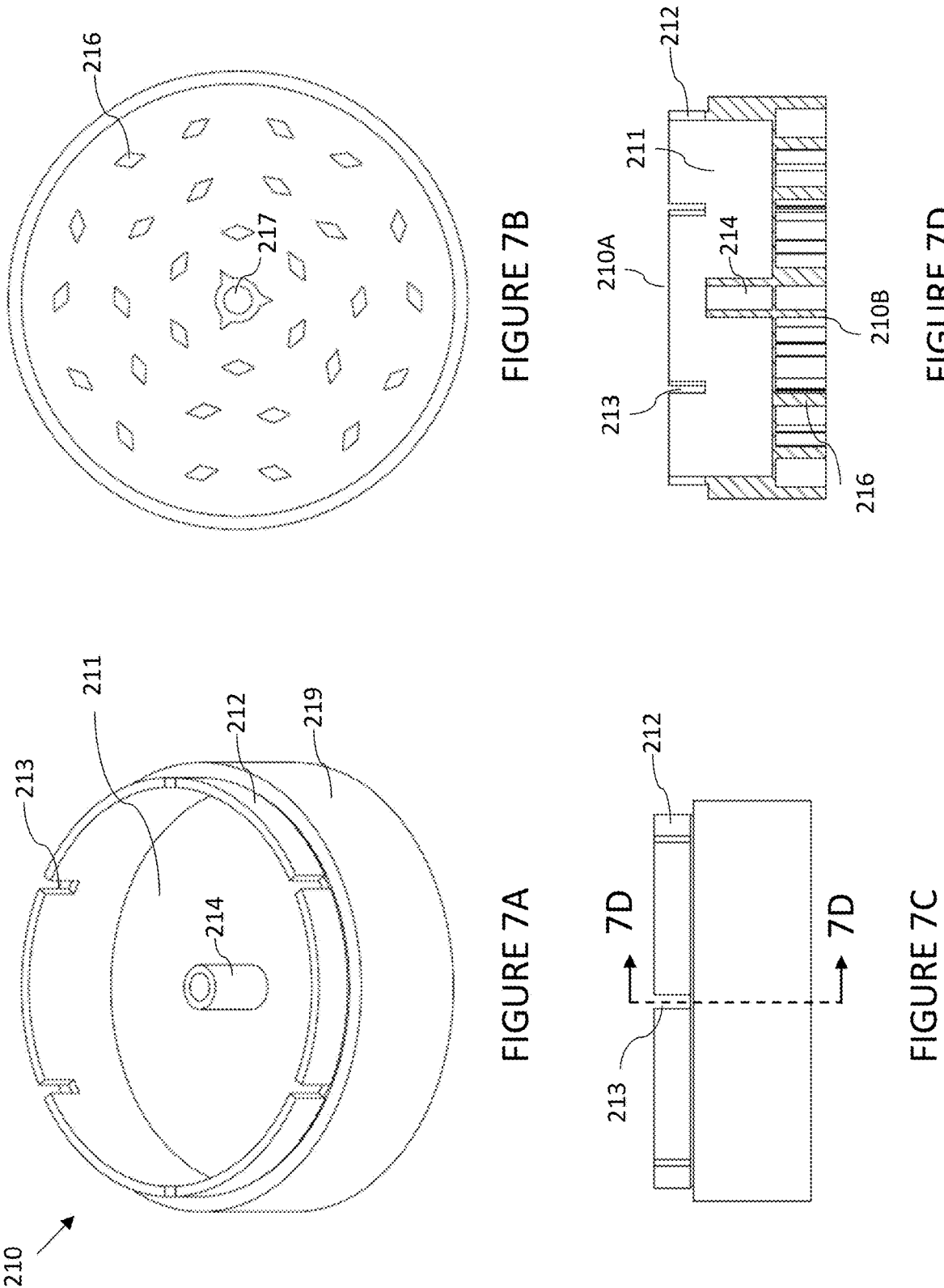
FIG. 7A depicts a perspective view of an exemplary top grinding component of the exemplary embodiment of the herb grinder.
FIG. 7B depicts a bottom plan view of the exemplary top grinding component of the exemplary embodiment of the herb grinder.
FIG. 7C depicts a front plan view of the exemplary top grinding component of the exemplary embodiment of the herb grinder.
FIG. 7D depicts a cross-section taken along line 7D-7D in FIG. 7C.
Figures 8A, 8B, 8C, 8D:
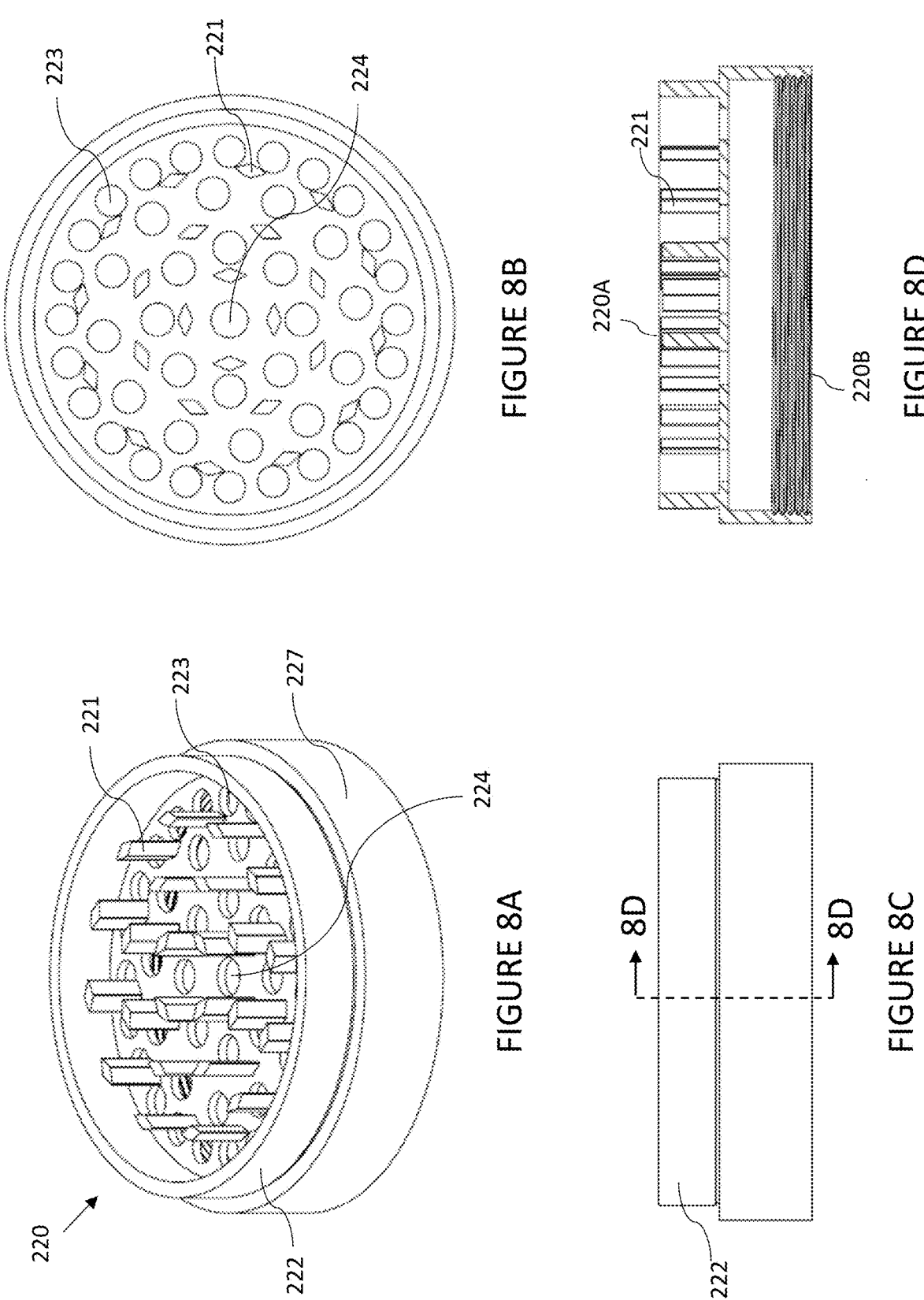
FIG. 8A depicts a perspective view of an exemplary bottom grinding component of the exemplary embodiment of the herb grinder.
FIG. 8B depicts a bottom plan view of the exemplary top grinding component of the exemplary embodiment of the herb grinder.
FIG. 8C depicts a front plan view of the exemplary bottom grinding component of the exemplary embodiment of the herb grinder.
FIG. 8D depicts a cross-section taken along line 8D-8D in FIG. 8C.

The bristle plate 120, as shown in FIGS. 5A to 5C, includes a first end 120A and a second end 120B. The first end 120A of the bristle plate 120 is coupled to the interior surface 110B of the lid 110, and the second end 120B further comprises a plurality of bristles 122 extending away thereof. Further, the bristle plate 120 preferably comprises at least one opening 121 configured to accommodate the at least one first interlocking connector 111. In the exemplary embodiment, the at least one opening 121 are a plurality of slits 121 dimensioned along a perimeter of the bristle plate 120. The slits 121 corresponds to the plurality of protrusions 111 and are configured to accommodate the plurality of protrusions 111. The bristle plate 120 may further comprise a through hole 123 corresponding to the first receptacle 112. A height of the bristle plate 120 is less than a height of the plurality of protrusions 111, such that the plurality of protrusions 111 of the lid 110 may extend through the bristle plate 120. Preferably, the plurality of bristles 122 are arranged in a plurality of bristle tufts 122A. Each of the bristle tufts 122A is attached to a bristles cap 122B on one end and arranged in a circled shaped ring, as shown in FIGS. 6A to 6C. In addition, the second end 120B of the bristle plate 120 comprises a plurality of recesses 124 configured to receive the bristle caps 122B and are arranged in a pattern comprising a plurality of concentric circles. It is anticipated that the arrangement and pattern of the plurality of bristle tufts 122A may vary.

Referring to FIGS. 7A to 7D, the top grinding component 210 has an upper end 210A and a lower end 210B. The upper end 210A is both interlocking and magnetically connected to the bristle assembly 100 and forms an internal space with the interior surface 110B of the lid 110 configured to receive the bristle plate 120. The upper end 210A comprises a third receptacle 214 configured to receive a magnet or a ferromagnetic material 215, and at least one second interlocking connector 213 corresponding to the at least one first interlocking connector 111 configured to form an interlocking connection with the lid 110. In the exemplary embodiment, the top grinding component 210 comprises a first peripheral wall 219 having an annular flange 212 extending inward from an upper portion of the first peripheral 219 wall, configured to be accommodated by the lid 110. The at least one second interlocking connector 213 are a plurality of notches 213 dimensioned along the annular flange 212 and corresponding to the plurality of protrusions 111 of the lid 110. The plurality of protrusions 111 extend through the slits 121 of the bristle plate 120 and engage with the notches 213 of the top grinding component 210. Consequently, relative rotation of the lid 10 and the top grinding component 210 may be prevented, and the bristle assembly 100 may be attached and detached easily to the top grinding component 210. Furthermore, the lower end 210B of the top grinding component 210 further comprises a plurality of top grinding blades 216 extending away thereof, and a third receptacle 217 configured to receive a magnet or a ferromagnetic material 218.

As depicted in FIGS. 8A to 8D, the bottom grinding component 220 has a top end 220A and a bottom end 220B. The top end 220A of the bottom grinding component 220 is magnetically connected to the lower end 210B of the top grinding component 210, such that the top end 220A of the bottom grinding component 220 may rotate relative to the lower end 210B of the top grinding component 210. The top grinding component 210 and the bottom grinding component 220 form a grinding compartment configured to accommodate herbs to be ground. Further, the bottom grinding component 220 comprises a plurality of bottom grinding blades 221 extending away from the top end 220A of the lower grinding component 220, which engages with the top grinding blades 216 of the top grinding component 210. The bottom grinding component 220 comprises a plurality of bores 224 configured to allow ground herbs to pass through the bottom grinding component 220 and into the collecting compartment 230. Preferably, the bottom grinding component 220 further comprises a second peripheral wall 227 having an inner rim 222 extending inward from an upper portion of the first peripheral 219 wall, configured to be accommodated by the lower end 210B of the top grinding component 210.

Figures 10A, 10B, 10C:
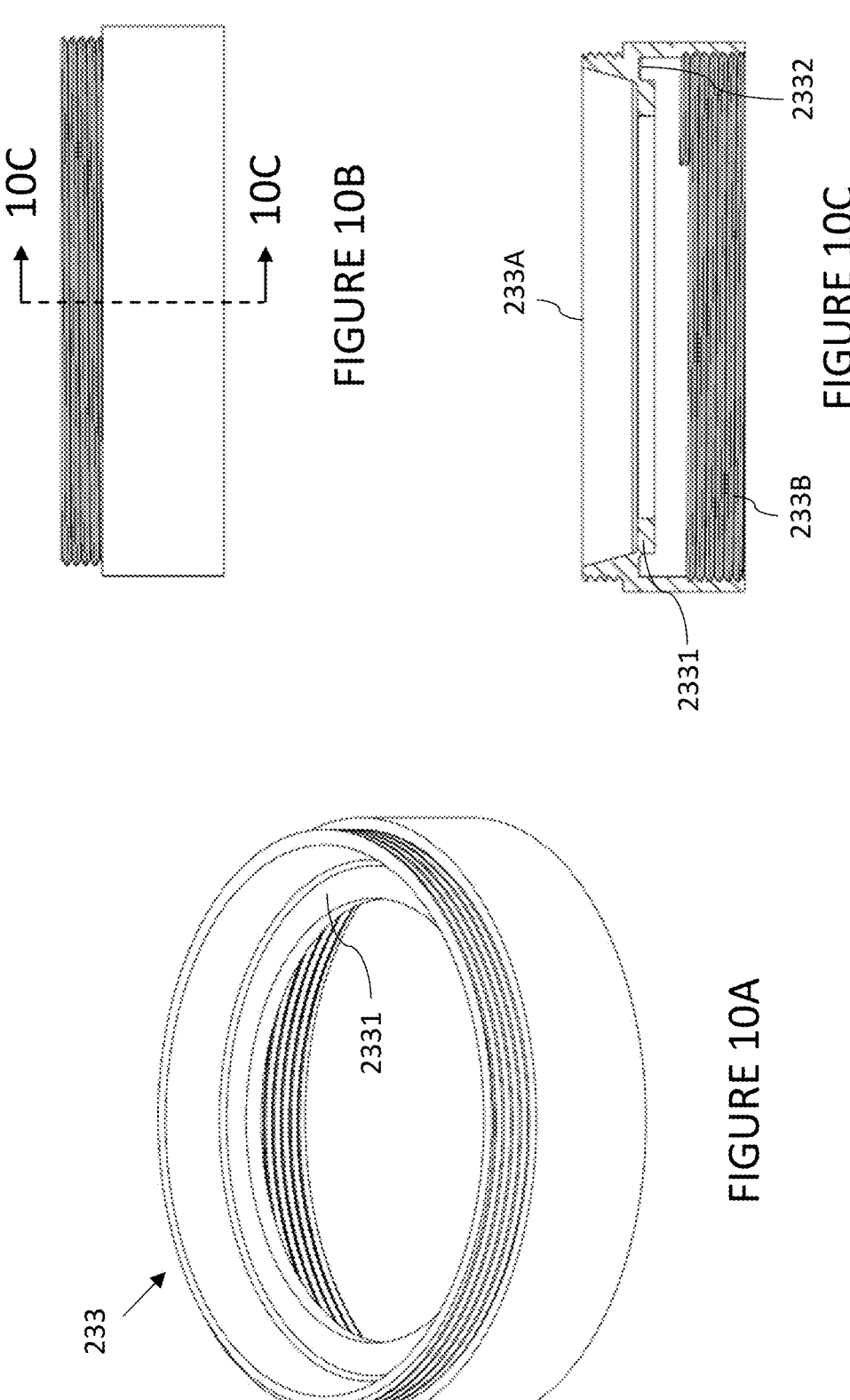
FIG. 10A depicts a perspective view of an exemplary chamber component of the exemplary embodiment of the herb grinder.
FIG. 10B depicts a front plan view of the exemplary chamber component of the exemplary embodiment of the herb grinder.
FIG. 10C depicts a cross-section taken along line 10C-10C in FIG. 10B.
Figures 11A, 11B, 11C, 11D:
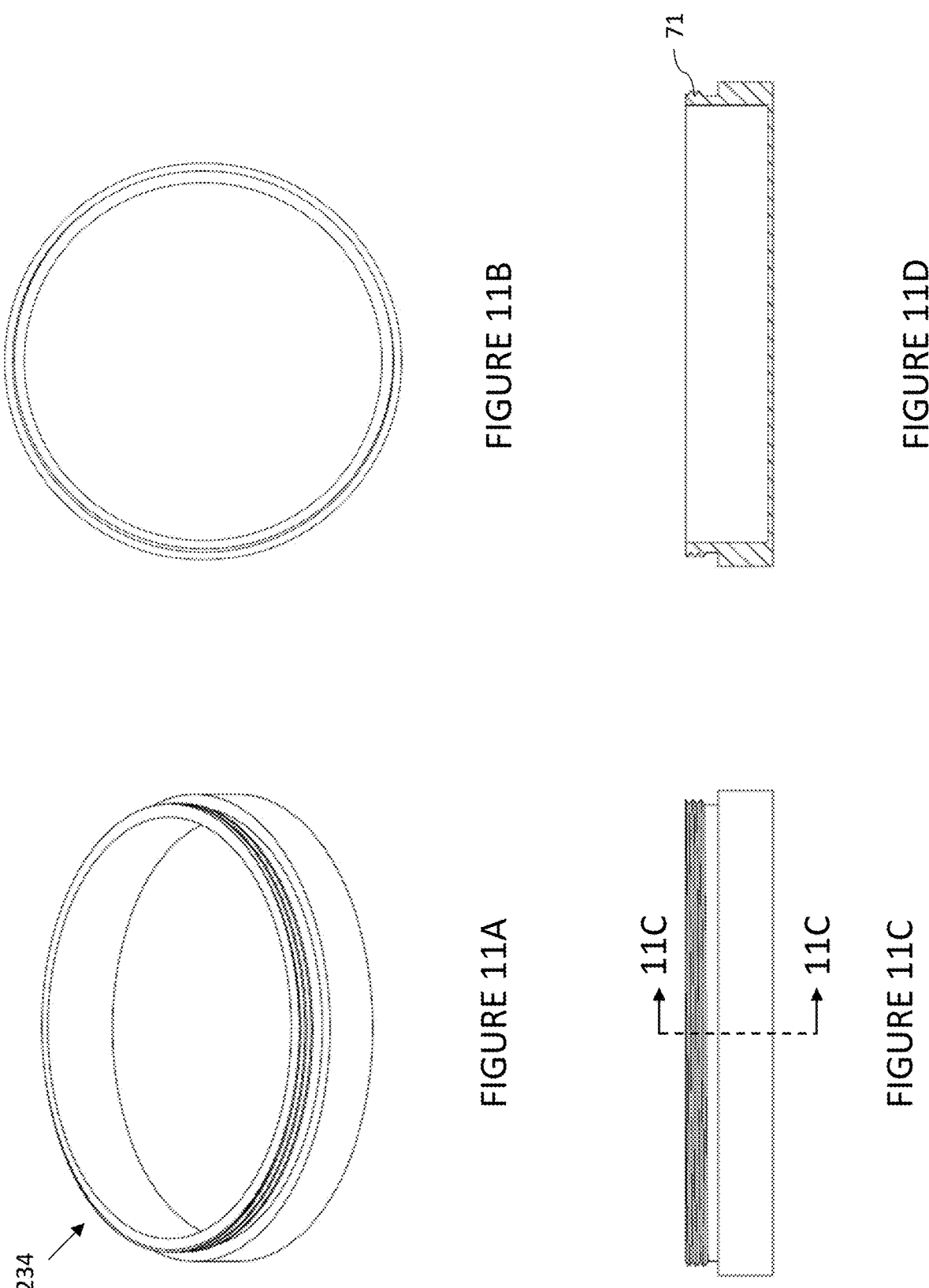
FIG. 11A depicts a perspective view of an exemplary base of the exemplary embodiment of the herb grinder.
FIG. 11B depicts a top plan view of the exemplary base of the exemplary embodiment of the herb grinder.
FIG. 11C depicts a front plan view of the exemplary base of the exemplary embodiment of the herb grinder.
FIG. 11D depicts a cross-section taken along line 11C-11C in FIG. 11B.

The collecting compartment 230 is threadly coupled to the bottom grinding component 220, forming an enclosed chamber and comprises a sieve 232 subdividing the enclosed chamber to an upper chamber and a lower chamber. The collecting compartment 230 may further comprise a screen holder 231, a chamber component 233, and a base 234, as shown in FIGS. 1 and 3. The chamber component 233 substantially has a tubular profile including two opening ends, a proximal end 233A and a distal end 2323B, as shown in FIGS. 10A to 10C. The proximal end 233A of the chamber component 233 may be threadly coupled to the bottom end 220B of the bottom grinding component 220, and the proximal end 233A may be threadly coupled to the base 234. Preferably, the chamber component 233 comprises an internal lip 2331 extending radially inwards, and the internal lip 2331 further includes a slot 2332 configured to receive the sieve holder 231. The sieve 232 is positioned between the internal lip 2331 of the chamber component 233 and the sieve holder 231, and the sieve holder 231 is pressed against the slot 2332 to secure the sieve 232. It is anticipated that the threads illustrated herein, may be other engaging structures such as snap-fits, quick releases, or other mechanisms without departing from the spirit of the invention.

Figure 12:
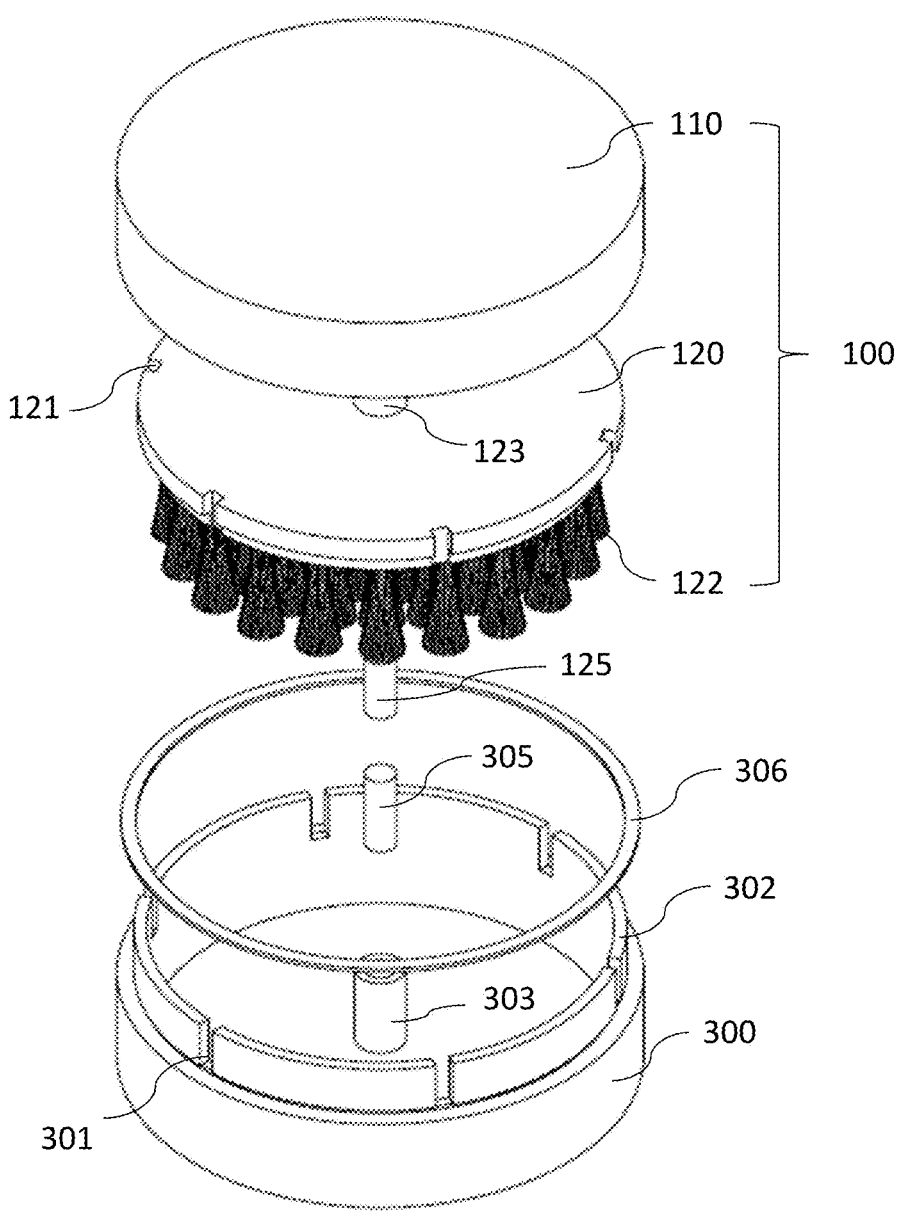
FIG. 12 depicts an exploded perspective view illustrating the exemplary grinding assembly is interchanged with an exemplary housing.
Figures 13A, 13B, 13C:
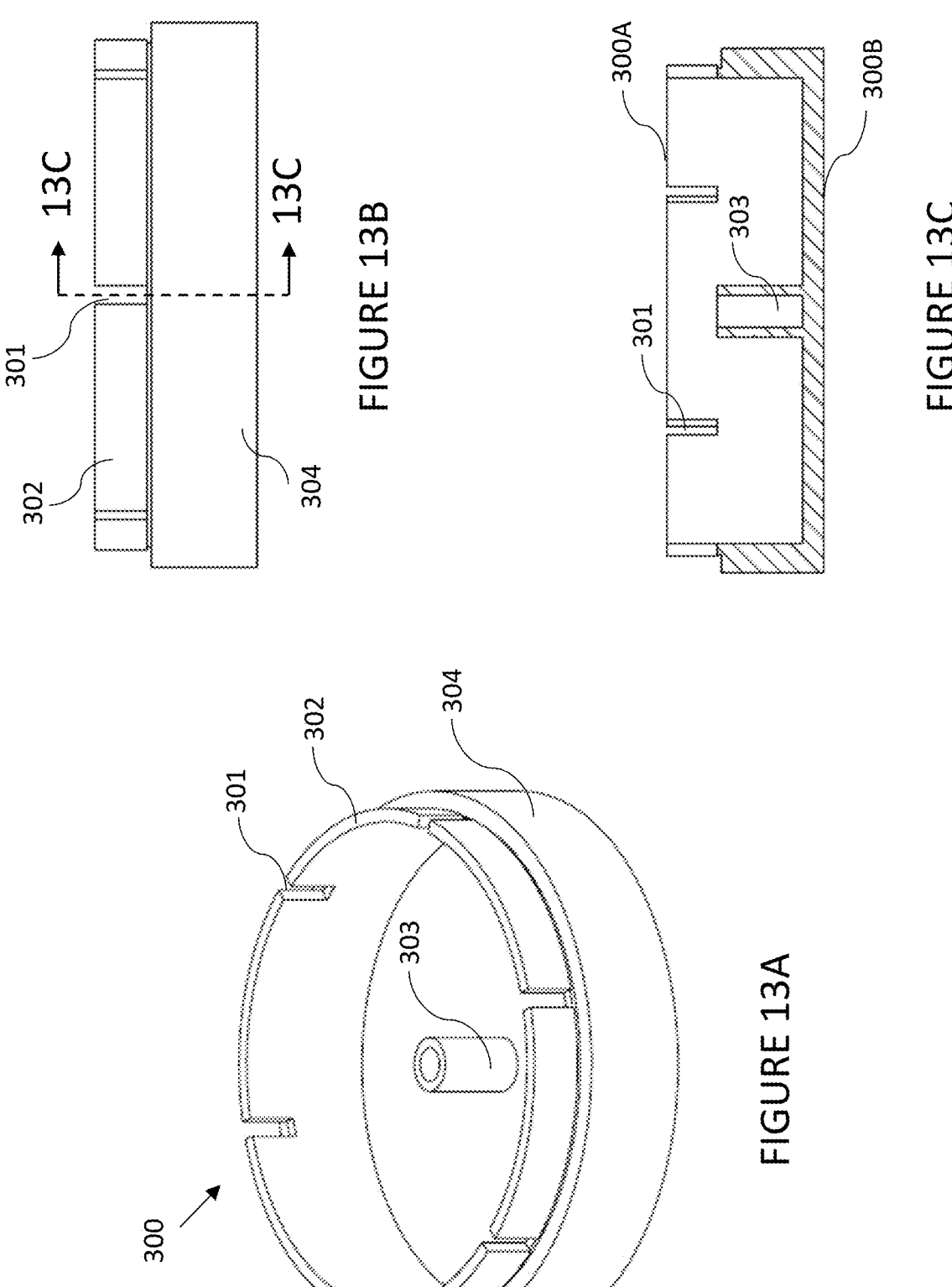
FIG. 13A depicts a perspective view of the exemplary housing of the exemplary embodiment of the herb grinder.
FIG. 13B depicts a front plan view of the exemplary housing of the exemplary embodiment of the herb grinder.
FIG. 13C depicts a cross-section taken along line 13C-13C in FIG. 11B.

The grinding assembly 200, as shown in FIG. 1, may be interchangeable with a housing 300, as shown in FIG. 12. Referring to FIGS. 13A to 13C, the housing 300 has a free end 300A and a closed end 300B. The free end 300A is magnetically connected to the bristle assembly 100 and forms an accommodation with the interior surface 110B of the lid 110 configured to receive the bristle plate 120. The free end 300A of the housing comprises at least one third interlocking connector 301 corresponding to the at least one first interlocking connector 111 configured to form an interlocking connection with the lid 110. In the exemplary embodiment, the housing 300 comprises a fourth peripheral wall 304 having a annular flange 302 extending inward from an upper portion of the fourth peripheral wall 304 and configured to be accommodated by the lid 110. Preferably, the at least one third interlocking connector 301 are a plurality of notches 301 dimensioned along the second annular flange 302 and corresponding to the plurality of protrusions 111 of the lid 110. The plurality of protrusions 111 extend through the slits 121 of the bristle plate 120 and engage with the notches 301 of the housing 300. In addition, the housing 300 comprises a fifth receptacle 303 configured to receive a magnet or a ferromagnetic material 305, such that the housing 300 and the bristle assembly 100 may also be magnetically connected.

It is anticipated that the number and arrangement of magnets, ferromagnetic materials, and receptacles of the herb grinder 1 may vary, provided that the bristle assembly 100 and the top grinding component 210 are magnetically connected, and the top grinding component 210 and the bottom grinding component 220 are magnetically connected.

The herb grinder 1 may further comprise a first o-ring 126 positioned between the lid and the upper end 210A of the top grinding component 210; and a second o-ring 226 positioned between the lower end 210B of the top grinding component 210 and the top end 220A of the bottom grinding component 220. Further, the herb grinder 1 may also comprise a third o-ring 306 positioned between the lid 110 and the housing 300.

It is preferable that the herb grinder 1 be constructed of rigid materials, including but not limited to aluminum, alloy, or other metals. The bristles 122 may be made of flexible materials, including but not limited to metallic materials such as aluminum, synthetic plastics such as nylon, rubber, or other natural materials such as animal hair or plant fibers. It is also preferable that the magnet is neodymium disc magnet, to provide stronger attraction. The sieve 232 is preferably made of non-corrosive mesh materials, such as metal or plastic mesh.

An exemplary method of using the herb grinder 1 is presented herein to further demonstrate the convenience and efficiency of the herb grinder 1. An exemplary user may detach the top grinding component 210 and the bottom grinding component 220 and place coarse herb particles to be ground within the grinding compartment and attach the top grinding component 210 back to the bottom grinding component 220. Then the exemplary user may apply a twisting force to the top and bottom grinding components 210, 220, such that the top grinding component 210 rotates relatively to the bottom grinding component 220. Upon completion of grinding, the exemplary user may detach the bristle plate 110 from the top grinding component 210, and separate the top grinding component 210 and the bottom grinding component 220. Next, the exemplary user may insert the bristles 122 into the lower end 210B of the top grinding component 210, or the top end 220A of the bottom grinding component 220, and brush off resinous substances such as kief. The exemplary user may also interchange the grinding assembly 200 with the housing 300, so the bristle assembly 100 may be stored and conveniently carried with other existing herb grinders. An additional advantage is that the bristle assemble 100 may facilitate more residual coarse herb particles to pass through the sieve 323. Although most of the ground herb particles passes through the through hole 223 of the bottom grinding component 220, through the sieve 232 and into the lower chamber of the colleting compartment 230, there may be more ground herb particles that can be collected. Therefore, when the exemplary user brushes the top end 220A of the bottom grinding component 220, additional ground herb particles may pass through the through hole 223 of the bottom grinding component 220 and through the sieve 232. As a result, additional ground herb particles are collected.

While the exemplary embodiment of the present disclosure has been disclosed, certain modifications may be made by those skilled in the art to modify the invention without departing from the spirit of the invention.

What is claimed:

1. An herb grinder with a cleaning attachment comprising:
  a bristle assembly;
    wherein the bristle assembly comprises a lid and a bristle plate;
    wherein the lid has an interior surface and an exterior surface;
    wherein the lid comprises at least one first interlocking connector on the interior surface;
    wherein the bristle plate comprises a first end and a second end;
    wherein the first end is coupled to the interior surface of the lid;
    wherein the bristle plate further comprises a plurality of bristles extending away from the second end;
  a grinding assembly;
    wherein the grinding assembly comprises a top grinding component, a bottom grinding component, and a collecting compartment;
    wherein the top grinding component has an upper end and a lower end;
    wherein the upper end is magnetically connected to the bristle assembly;
    wherein the upper end comprises at least one second interlocking connector corresponding to the at least one first interlocking connector configured to form an interlocking connection with the lid;
    wherein the upper end and the interior surface of the lid form an internal space configured to receive the bristle plate;
    wherein the top grinding component further comprises a plurality of top grinding blades extending away from the lower end;

wherein the bottom grinding component has a top end and a bottom end;

wherein the top end of the bottom grinding component is rotatably connected to the lower end of the top grinding component, forming a grinding compartment;

wherein the bottom grinding component further comprises a plurality of bottom grinding blades extending away from the top end and engaging with the top grinding blades;

wherein the collecting compartment is coupled to the bottom end of the bottom grinding component and form an enclosed chamber;

wherein the collecting compartment further comprises a sieve subdividing the enclosed chamber to an upper chamber and a lower chamber.

2. The herb grinder as described in claim 1, wherein the at least one first interlocking connector comprises a plurality of protrusions, and the at least one second interlocking connector comprises a plurality of notches.

3. The herb grinder as described in claim 2, wherein the plurality of protrusions are dimensioned along a perimeter of the interior surface of the lid and extend radially inwards from the perimeter.

4. The herb grinder as described in claim 1, wherein the bristle plate further comprises at least one opening configured to accommodate the at least one first interlocking connector of the lid.

5. The herb grinder as described in claim 1, wherein the interior surface of the lid further comprises a first receptacle; wherein the upper end of the top grinding component further comprises a second receptacle corresponding to the first receptacle; and wherein the first receptacle and the second receptacle are configured to receive a magnet or a ferromagnetic material.

6. The herb grinder as described in claim 1, wherein the lower end of the top grinding component further comprises a third receptacle; wherein the top end of the bottom grinding component further comprises a fourth receptacle corresponding to the third receptacle; and wherein the third receptacle and the fourth receptacle are configured to receive a magnet or a ferromagnetic material.

7. The herb grinder as described in claim 2, wherein the top grinding component comprises a first peripheral wall having an annular flange extending inward from an upper portion of the first peripheral wall, configured to be accommodated by the lid; and wherein the plurality of notches is dimensioned on the annular flange.

8. The herb grinder as described in claim 1, wherein the herb grinder further comprises a first o-ring positioned between the lid and the upper end of the top grinding component; and a second o-ring positioned between the lower end of the top grinding component and the top end of the bottom grinding component.

9. The herb grinder as described in claim 1, wherein the plurality of bristles are arranged in a plurality of bristle tufts, and wherein the plurality of bristle tufts are arranged in a pattern comprising a plurality of concentric circles.

10. The herb grinder as described in claim 1, wherein the collecting compartment comprises a chamber component; a sieve holder placed within the chamber component configured to secure the sieve, and a base coupled to the chamber component.

11. An herb grinder with a cleaning attachment comprising:

a bristle assembly;

wherein the bristle assembly comprises a lid and a bristle plate;

wherein the lid has an interior surface and an exterior surface;

wherein the lid comprises at least one first interlocking connector on the interior surface;

wherein the bristle plate comprises a first end and a second end;

wherein the first end is coupled to the interior surface of the lid;

wherein the bristle plate further comprises a plurality of bristles extending away from the second end;

a grinding assembly;

wherein the grinding assembly comprises a top grinding component, a bottom grinding component, and a collecting compartment;

wherein the top grinding component has an upper end and a lower end;

wherein the upper end is magnetically connected to the bristle assembly;

wherein the upper end comprises a second interlocking connector corresponding to the first interlocking connector configured to form an interlocking connection with the lid;

wherein the upper end and the interior surface of the lid form an internal space configured to receive the bristle plate;

wherein the top grinding component further comprises a plurality of top grinding blades extending away from the lower end;

wherein the bottom grinding component has a top end and a bottom end;

wherein the top end of the bottom grinding component is rotatably connected to the lower end of the top grinding component, forming a grinding compartment;

wherein the bottom grinding component further comprises a plurality of bottom grinding blades extending away from the top end and engaging with the top grinding blades;

wherein the collecting compartment is coupled to the bottom end of the bottom grinding component and form an enclosed chamber;

wherein the collecting compartment further comprises a sieve subdividing the enclosed chamber to an upper chamber and a lower chamber;

a housing;

wherein the housing is interchangeable with the grinding assembly and comprises a free end and a closed end;

wherein the free end is magnetically connected to the bristle assembly;

wherein the free end comprises at least one third interlocking connector corresponding to the first interlocking connector configured to form an interlocking connection with the lid; and wherein the free end and the interior surface of the lid form an accommodation configured to receive the bristle plate.

12. The herb grinder as described in claim 11, wherein the at least one first interlocking connector comprises a plurality of protrusions, and the at least one second interlocking connector comprises a plurality of notches.

13. The herb grinder as described in claim 12, wherein the plurality of protrusions are dimensioned along a perimeter of the interior surface of the lid and extend radially inwards from the perimeter.

14. The herb grinder as described in claim 11, wherein the bristle plate further comprises at least one opening configured to accommodate the at least one first interlocking connector of the lid.

15. The herb grinder as described in claim 11, wherein the interior surface of the lid further comprises a first receptacle; wherein the upper end of the top grinding component further comprises a second receptacle corresponding to the first receptacle; and wherein the first receptacle and the second receptacle are configured to receive a magnet or a ferromagnetic material.

16. The herb grinder as described in claim 11, wherein the lower end of the top grinding component further comprises a third receptacle; wherein the top end of the bottom grinding component further comprises a fourth receptacle corresponding to the third receptacle; and wherein the third receptacle and the fourth receptacle are configured to receive a magnet or a ferromagnetic material.

17. The herb grinder as described in claim 12, wherein the top grinding component comprises a first peripheral wall having an annular flange extending inward from an upper portion of the first peripheral wall, configured to be accommodated by the lid, and wherein the plurality of notches are dimensioned on the annular flange.

18. The herb grinder as described in claim 11, wherein the herb grinder further comprises a first o-ring positioned between the lid and the upper end of the top grinding component; and a second o-ring positioned between the lower end of the top grinding component and the top end of the bottom grinding component.

19. The herb grinder as described in claim 11, wherein the plurality of bristles are arranged in a plurality of bristles tufts, and wherein the plurality of bristles tufts are arranged in a pattern comprising a plurality of concentric circles.

20. The herb grinder as described in claim 11, wherein the collecting compartment comprises a chamber component; a sieve holder placed within the chamber component configured to secure the sieve, and a base coupled to the chamber component.

* * * * *